United States Patent [19]

Fleck

[11] Patent Number: 4,759,277

[45] Date of Patent: Jul. 26, 1988

[54] FUMIGANT PROBING APPARATUS

[75] Inventor: Frank Fleck, Arcadia, Calif.

[73] Assignee: Pestcon Systems, Inc., Alhambra, Calif.

[21] Appl. No.: 931,529

[22] Filed: Nov. 17, 1986

[51] Int. Cl.$^4$ ............................................. A23L 3/34
[52] U.S. Cl. ................................... 99/482; 99/494; 99/532; 422/292; 422/305
[58] Field of Search ............... 99/467, 482, 485, 473, 99/516, 494, 532, 533; 422/32, 29, 292, 305; 426/335; 141/11, 69, 70

[56] References Cited

U.S. PATENT DOCUMENTS

| | | | |
|---|---|---|---|
| 3,939,287 | 2/1976 | Orwig et al. | 99/516 X |
| 4,059,048 | 11/1977 | Dickson | 99/482 |
| 4,509,682 | 4/1985 | Heiman et al. | 99/467 X |
| 4,641,573 | 2/1987 | Gunn | 99/482 |

Primary Examiner—Timothy F. Simone
Attorney, Agent, or Firm—MacDonald, Halsted & Laybourne

[57] ABSTRACT

Fumigation apparatus for placing solid fumigant in grain in ship holds, using a gas-permeable sleeve that is telescoped within an elongated tubular probe to be driven into the grain by a probe manipulator mechanism. The mechanism has three sets of drive rollers in a housing that is clamped around the lower end portion of the probe at the surface of the grain, the mechanism being releasably secured to a foldable base platform and driven by a power operator including a reversible electric motor and a reduction gear box. The sleeve is fabric, having a funnel-shaped open upper end and a closed lower end above a flap or tail for hanging out of the probe during installation. A flexible line is secured to the probe for repeated use in pulling sleeves into the probe for rapid placement of the sleeves after introduction of fumigant.

16 Claims, 4 Drawing Sheets

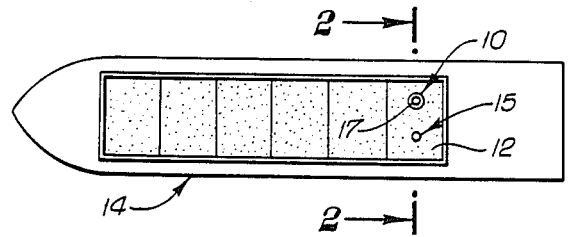
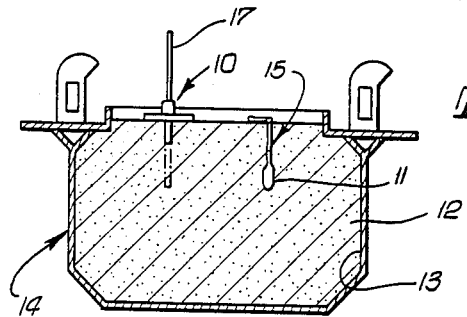
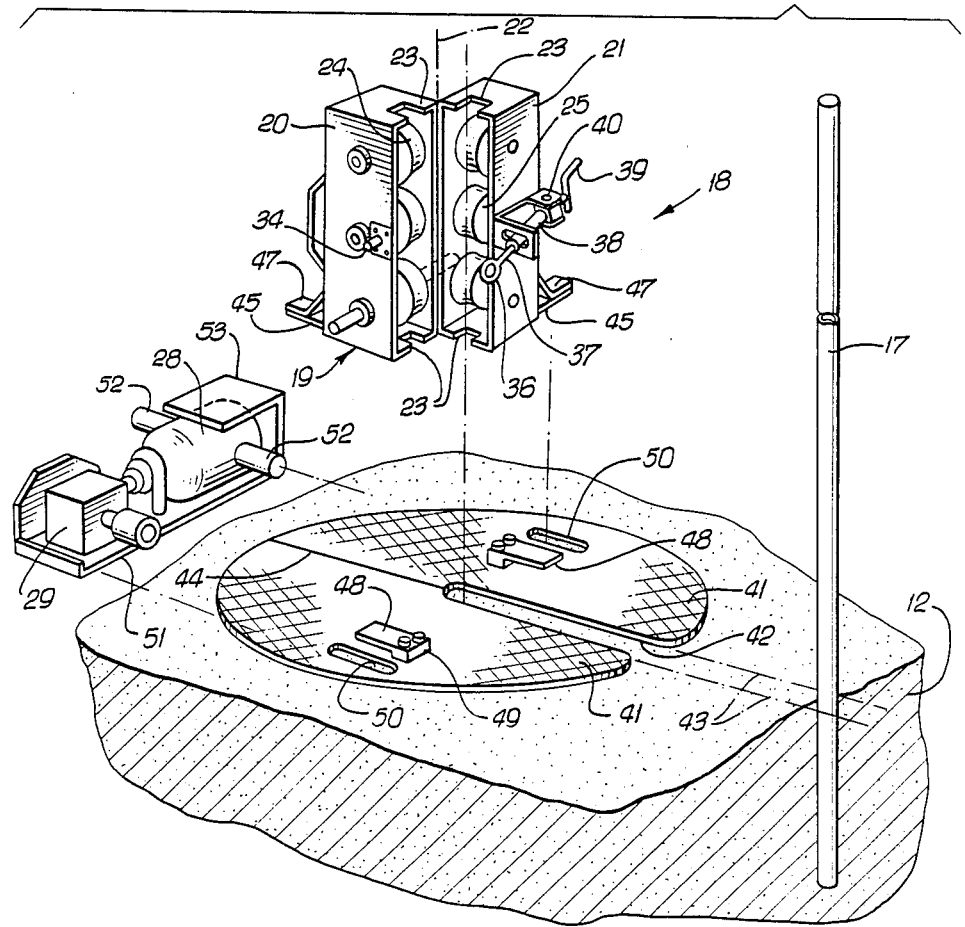

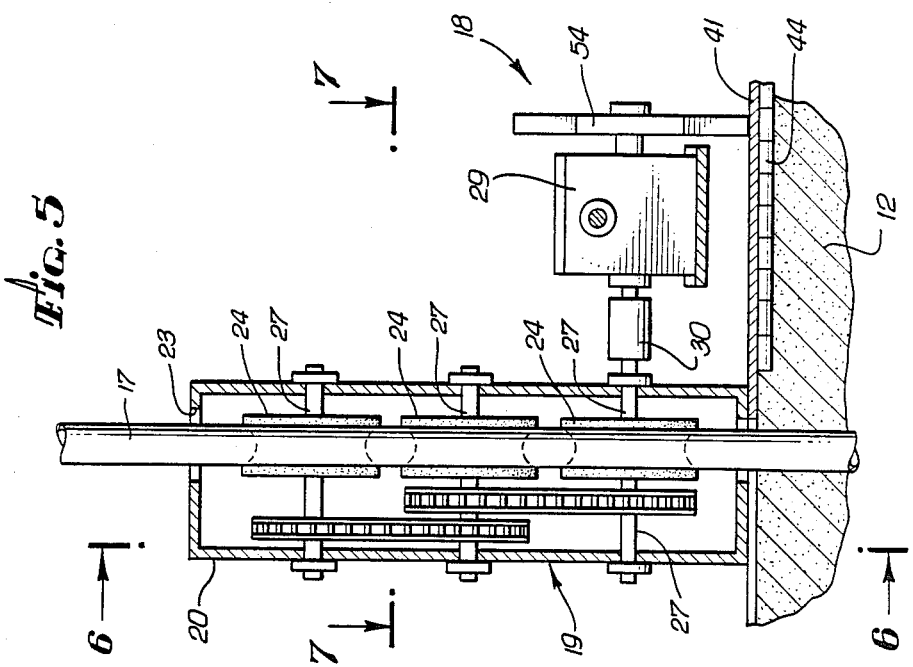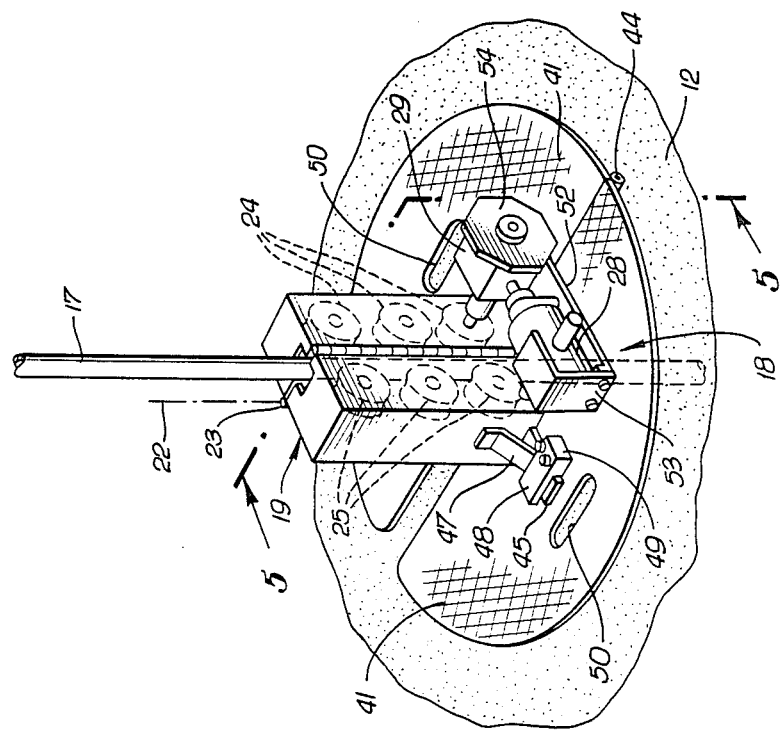

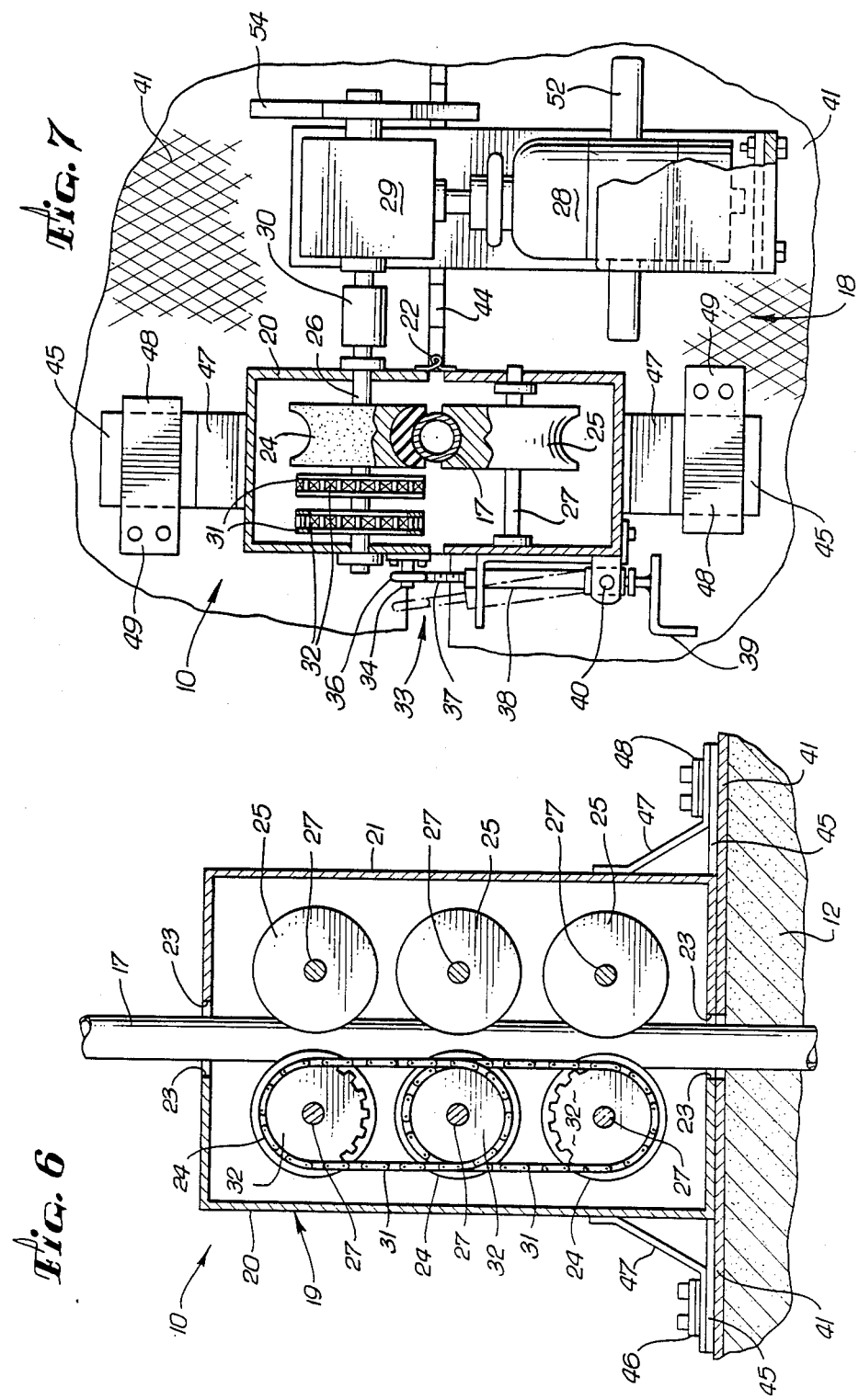

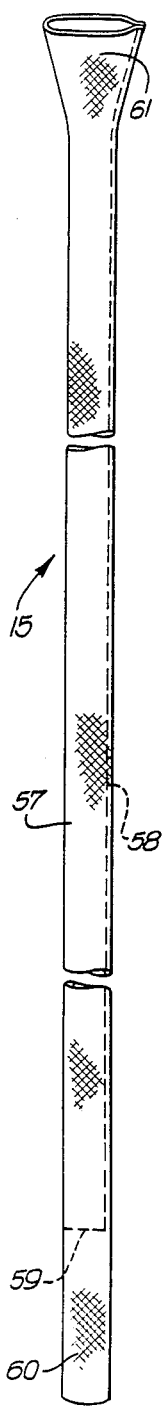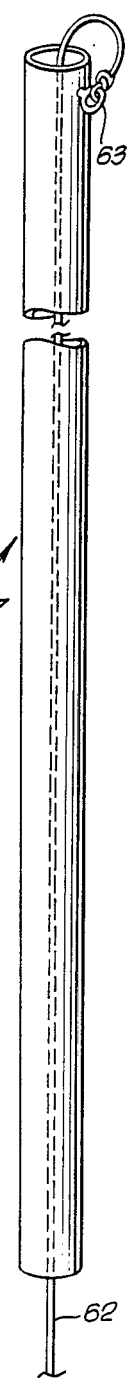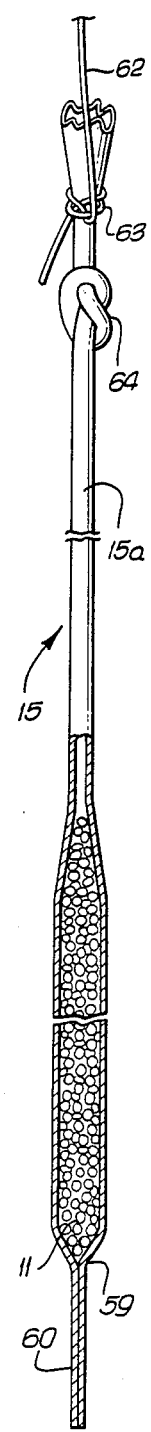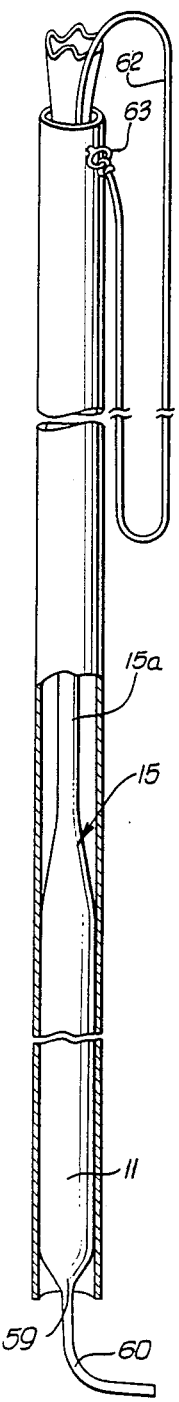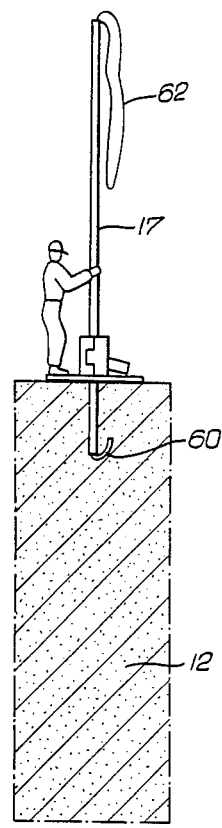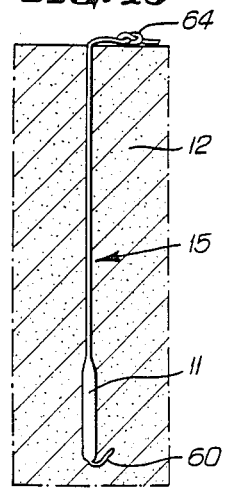

FUMIGANT PROBING APPARATUS

This invention relates generally to the fumigation of commodities in bulk-storage compartments, and relates more particularly to a method and apparatus for use in the fumigation of grain in the holds of seagoing vessels or in other large containers, using fumigants that produce toxic gases for permeating the body of grain and killing pests such as insects or rodents.

The invention is particularly useful in the placement of a solid fumigant such as aluminum phosphide that decomposes in the presence of air and water to form hydrogen phosphide, or phosphine, a toxic gas that is very successful as a fumigant. Aluminum phosphide usually is applied in tablet form and, after decomposing, leaves a powdery residue. Reference is made to U.S. Pats. Nos. 2,826,486, 2,826,587 and 3,132,067 for details as to fumigants of this type, and to U.S. Pat. Nos. 4,509,682 and 4,579,714 for recently developed methods and apparatus for placing such fumigants in grain or the like and confining the residue for removal from the grain after fumigation.

As explained in the latter two patents, it is desirable to place the fumigant well below the surface of the grain to improve the penetration of the fumigating gas throughout the storage compartment. These two patents disclose different methods and apparatus for this purpose, one in which fumigant receptacles are placed at or near the floor of the compartment before the grain is loaded, and then are charged with fumigant through feed tubes from the surface of the grain, and the other using elongated fabric sleeves that are pushed into the grain by an elongated, rigid probe that serves as a filler pipe for each sleeve. Tablets are introduced through the filler pipe as it is withdrawn from a sleeve.

The present invention is an improved method and apparatus for placing solid fumigant in grain or the like and retaining the residue of the fumigant for removal.

SUMMARY OF THE INVENTION

The invention resides in a novel method and apparatus for placing solid fumigant more rapidly and deeply in grain or the like than heretofore has been achievable in a commercially practical fashion. This is accomplished by telescoping an elongated, gas-permeable sleeve with an elongated tubular probe and driving the telescoped probe and sleeve into the grain with a power-operated manipulator mechanism which grips the outside of the probe and, when activated, forces the probe and the sleeve, together, more deeply into the grain than was achievable with the prior sleeve/pipe combination and the prior manual insertion, and much more rapidly and econmically than was possible with the pre-positioned receptacles of U.S. Pat. No. 4,509,682.

More specifically, in the presently preferred embodiment of the invention, a gas-permeable sleeve is disposed within an elongated tubular probe with one end secured to the lower end of the probe and its other end adjacent the upper end of the probe, and the manipulator mechanism is clamped around the probe at the surface of the grain and activated to drive the probe and sleeve deeply into the grain. Then the mechanism is reversed to back the probe out of the grain, the lower end of the sleeve being anchored in the grain to hold the sleeve in place as the probe is withdrawn.

The manipulator mechanism of the invention comprises a housing adapted to be disposed about the lower end portion of a probe at the surface of the grain, with the probe extending through a probe-receiving station in the mechanism, drive means in the housing for gripping the probe and forcing it downwardly into the grain, a reversible power operator for the drive means, and means for holding the mechanism against the upward reactive force generated as the probe is driven into the grain. The preferred drive means comprise at least one pair of rollers disposed on opposite sides of the probe-receiving station. The pair of rollers is mounted in the housing to be spread apart, or opened, to receive the probe and then closed to clamp the probe firmly in the mechanism.

The drive means includes a reversible electric motor coupled to the rollers through a reduction gear box for developing an appropriate driving force, and the means for holding the mechanism against the upward reactive force is a base secured to the housing and positionable on the surface of the grain, preferably straddling the filler pipe in the probe-receiving station and positioned to form a work platform for the operator or operators, whose weight thus is added to that of the mechanism to hold the latter down as the probe is driven.

The preferred drive mechanism has a plurality of pairs of drive rollers that are spaced apart along the probe-receiving station, longitudinally of the probe, and are mounted in two separable side sections of the housing, which herein are hinged together about an axis that is upright in use, to swing between open and closed positions. One roller in each pair is in one of the side sections, and tied to the other rollers in that section for driving in unison. The other roller of each pair is an idler or backing roller and is rotatably supported in the other side section of the housing. When the side sections are drawn together from opposite sides of the probe-receiving station, the rollers are clamped tightly against a probe in the probe-receiving station, at least the drive rollers preferably having rough surfaces for gripping the probe.

For ease and rapidity of the set-up and take-down operations, which are very important when numerous sleeves are being emplaced, the base or platform comprises two side plates that are disposed on opposite sides of the probe-receiving station and define an access notch that permits sliding of the platform around a probe standing upright above the grain. The plates are hinged together on the side of the probe-receiving station opposite the notch to permit folding for ease of handling, and have two anchor bars that are spaced above the plates to overlie hold-down brackets on the side sections, engageable and disengageable in a quick and easy operation.

The illustrative sleeve is disposed inside the probe with a closed end adjacent the lower end of the probe, a flap hanging out of the probe to secure the sleeve in place as the probe is driven, and an upper end portion that preferably is funnel-shaped to facilitate pouring of fumigant tablets into the sleeve. For ease of handling of successive sleeves, a flexible line preferably is provided to extend through the probe, to be tied to the open end of a sleeve beneath the probe and to draw the sleeve up into the probe. The line may be secured to the upper end portion of the probe, as a part of the apparatus, to be pulled back into the probe as the latter is withdrawn from the grain and removed from a sleeve that is being emplaced. This prepares the line for use in drawing the next sleeve into the probe.

Other features and advantages of the invention will become apparent from the following detailed description, in conjunction with the accompanying drawings.

BRIEF DESCRIPTION OF THE DRAWINGS

FIG. 1 is a schematic plan view of a ship hull having a series of holds, one of which is equipped with a fumigation apparatus in accordance with the present invention;

FIG. 2 is an enlarged schematic cross-sectional view taken generally along line 2—2 of FIG. 1;

FIG. 3 is an exploded perspective view, on a further enlarged scale and partly in cross-section, of a fumigation apparatus in accordance with the present invention, the apparatus being shown with the drive mechanism in the open position and with a representative probe and sleeve assembly positioned in the grain in a hold preparatory to emplacement of the sleeve in the grain;

FIG. 4 is a perspective view of the parts shown in FIG. 3 assembled and with the drive mechanism in the closed position;

FIG. 5 is an enlarged cross-sectional view taken generally along line 5—5 of FIG. 4;

FIG. 6 is a cross-sectional view taken generally along line 6—6 of FIG. 5;

FIG. 7 is a fragmentary cross-sectional view taken generally along line 7—7 of FIG. 5;

FIG. 8 is an enlarged side elevational view of a sleeve in accordance with the invention, with parts removed for compactness;

FIG. 9 is an enlarged side elevational view of a tubular probe in accordance with the invention, equipped with a line for drawing sleeves into the probe, parts of the probe and the line being removed for compactness;

FIG. 10 is a side elevational view of the sleeve after introduction of the fumigant tablets, knotting of the open end and attachment of the line;

FIG. 11 is a side elevational view similar to FIGS. 9 and 10, partly in cross-section, with the filled sleeve of FIG. 10 in place in the probe of FIG. 9;

FIG. 12 is a schematic side elevational view showing the apparatus in use by an operator, the grain being shown in cross-section; and FIG. 13, is a schematic view similar to FIG. 12, showing the sleeve in the grain, after removal of the probe and the drive mechanism.

DETAILED DESCRIPTION OF THE PREFERRED EMBODIMENT

As shown in the drawings for purposes of illustration, the invention is embodied in an apparatus, indicated generally by the reference number 10 in the drawings, for placing solid fumigant such as aluminum phosphide 11 (FIGS. 2, 10, 11 and 13) in tablet form in a body 12 of grain or the like in a storage compartment such as a hold 13 in a seagoing vessel 14. The illustrative vessel is shown as having six such holds, each having an open upper side through which the grain is loaded into the hold, later to be closed by a hatch cover (not shown) and sealed for shipment.

The sizes of the holds of such vessels vary, but a typical hold may be as much as fifty to sixty feet deep and sixty to seventy feet in width and length, to hold thousands of bushels of grain. Solid fumigant is placed in each hold before it is sealed, to release fumigating gas in the hold to be dispersed throughout the grain and hopefully to reach all zones of the hold while the grain is in transit, thereby eradicating all of the pests in the grain. As previously indicated the present invention is designed for use in placing the solid fumigant deeply in the grain in a rapid and relatively easy manner, in sleeves 15 which retain the powdery residue of the fumigant for later removal from the grain.

In accordance with the present invention, the sleeves 15 are emplaced in the grain in telescoped relation with an elongated tubular probe 17 which is driven deeply into the grain, and subsequently removed, by a power-operated manipulator mechanism 18 that is capable of more rapid and effective operation than was achievable with prior methods and apparatus. The manipulator mechanism is fitted around the probe with the latter in an upright position over the grain and, when activated, drives the probe and the sleeve deeply into the grain and then withdraws the probe, leaving the sleeve and the contained fumigant in place in the grain.

As shown in FIGS. 3 through 7, the preferred embodiment of the manipulator mechanism 18 comprises a housing 19 having two box-like side sections 20 and 21 that are hinged together along one side of the housing to swing about an axis 22 that is upright in use. The side sections have open sides facing toward each other, and swing away from each other about the axis 22 to an open position, shown in FIG. 3, and toward each other to a closed position (FIGS. 4 through 7). The upper and lower ends of both side sections are centrally notched at 23 to form openings for passing a pipe through the housing when the housing is closed. These openings cooperate with the other parts in defining a probe-receiving station extending through the manipulator mechanism 18.

Mounted in the housing 19 are drive means for engaging a probe 17 in the probe-receiving station and driving the probe endwise through the housing, first downwardly into the grain 12 and then upwardly out of the grain. For this purpose, at least one pair of drive rollers 24 and 25 are disposed on opposite sides of the probe-receiving station in the housing, one roller 24 or 25 being rotatably mounted in each side section 20, 21 on a generally horizontal axis with one side of the roller adjacent the open side of the side section. Herein there are three such pairs of drive rollers 24, 25 that are spaced apart longitudinally of the probe-receiving station, generally vertically when the mechanism is in use. Each roller has an arcuately grooved periphery, to fit the curvature of a probe, and is mounted on a stub shaft 27 (see FIGS. 5 and 7) with its opposite ends rotatably received in the sidewalls of the housing sections.

To drive the mechanism 18 one of the shafts 27, the lowermost shaft in the left-hand housing section 21 as viewed in FIG. 6, is coupled to a power operator 28, herein a reversible electric motor coupled to a gear box 29 which, in turn, is coupled to the driven shaft 27 by a quick-connect/quick-release coupling 30. As can be seen in FIGS. 5 and 6, the three shafts 27 in the housing section 21 are tied together by chains 31 trained around sprockets 32 on the shafts so that the motor drives all three of the rollers 24 in this half of the housing.

The other rollers 25 of the three pairs are idler rollers which define the opposite side of the probe-receiving station from the drive rollers 24. The idler rollers simply press against the opposite side of the probe to clamp it against the drive rollers. This clamping action is accomplished as an incident to the opening and closing of the housing about the hinge axis 22.

As can be seen in FIG. 7, the housing 19 has a piano-type hinge 32 that joins the two side sections 20 and 21 together along one side, the right-hand side as viewed in FIG. 7, and has an adjustable clamping device 33 on the opposite side, for pulling the free edges of the two side sections toward each other. The rollers 24 and 25 of each pair are positioned in the housing to come into engagement with the opposite sides of a probe 17 of predetermined diameter in the probe-receiving station before the free edges of the side sections come together, leaving a gap between these edges, as shown. The clamping device herein comprises a pin 34 that is mounted on one side section beside the free edge thereof, and a screw-latching mechanism on the other side section, having a latching eye 36 on the end of a screw 37 that is threaded through a sleeve 38 mounted on a mounting plate that is secured to the side section. On the end of the sleeve opposite the eye 36, beyond the end of the side section, is a hand crank 39 for turning the sleeve and thus drawing the eye toward the sleeve. The latter is rotatably mounted on a pivot 40 which permits rocking of the sleeve and the eye toward and away from the housing 19, for ease in positioning the eye over the pin 34. The pin preferably is inclined slightly away from the screw-latching mechanism, for secure engagement with the eye. With the screw latching mechanism, the tightness of the clamping action can be varied, or minor variations in the size of probes can be accommodated.

A relatively large base is provided for the manipulator mechanism 18 to form a platform on which an operator or operators can stand to stabilize the mechanism in operation, as shown in FIG. 12, and to add weight to the mechanism to resist the reactive forces of the probe-driving operation. Herein the base is formed by two flat plates 41 that are disposed in edge-to-edge relation beneath the housing 19 and on opposite sides of the probe-receiving station. The adjacent edges are cut away to form an access notch 42 that opens into the platform from one side, permitting sliding of the platform into position around a probe 17 in an upright position, as indicated by the lines 43 in FIG. 3, and are hinged together at 44 (see FIG. 5) beyond the notch, for folding of the platform for ease of handling. This hinge also may be a piano hinge, as shown.

To hold the housing 19 on the base plates 41, each housing side section 41 has a laterally projecting hold-down bracket 45, on the side opposite the open side, reinforced by braces 47 and positioned to lie against the base plates. The base plates carry two anchor bars 48 that are spaced above the base plates to overlie the hold-down brackets, each bar herein having a free end portion projecting cantilever fashion from a thickened mounting end 49 that is bolted to the base plate. The free end portions face in opposite directions, as shown in FIG. 3, so that the housing can be positioned between them, with the hold-down brackets aligned with the openings beneath the bars, and then rotated to swing the brackets beneath the bars. Hand openings 50 (FIG. 3) are provided in the base plates to facilitate carrying them in the folded condition.

As best seen in FIG. 3, the manipulator mechanism 18 comprises three separable assemblies—the base platform, the power operator assembly and the probe clamping assembly—which can be quicky and easily assembled around a probe 17 that is positioned for insertion in the grain, as shown on the right in FIG. 3. First, the base plates 41 are moved into place around the probe, bringing the latter to the closed end of the notch 42. Then the open housing 19 is placed around the probe, in the condition shown in FIG. 3, and is closed to bring the drive rollers 24, 25 into engagement with the probe. The housing then is turned on the base to move the hold-down brackets 45 under the anchor bars 49, and the power operator 28 is placed beside the housing and coupled to the lower drive shaft 27. Preferably, a chain or other hold-down member (not shown) is provided to secure the power operator assembly releasably to the base platform.

For ease of handling, the motor 28 and the gear box 29 are mounted on a common base 51, such as an elongated rectangular plate, and the motor is provided with two laterally projecting carrying handles 52. An L-shaped backing and cover plate 53 is provided to lie behind and above the motor, and a side plate 54 on the side of the base plate opposite the output shaft of the gear box 29 supports the gear box at the proper height for engagement with the input shaft of the clamping assembly. The coupling 30 is a simple coupling sleeve for drivingly engaging the end of the lower shaft 27.

While the various details of construction may be varied, it is noted that the motor 28 may be a standard, heavy-duty electric drill motor with the gear box 29 providing a substantial reduction, such as thirty to one. Aluminum plate preferably is used for the various structural components for lightness in weight, and the drive rollers are composed of a suitable strong metal, preferably with a special gripping surface on the driven rollers. This may be simply a rubber surface, or may be a knurled surface for better gripping of the probe.

A suitable probe construction is a length of polyvinylchloride tubing on the order of one and one-half inches in inside diameter and having opposite open ends. For probing fumigant to different depths, different lengths of probe are provided, typically in lengths of from ten feet to twenty feet.

The preferred sleeve 15 is shown in FIGS. 8 through 12 as being of flexible fabric construction, folded along one side 57 and sewn at 58 along the other side, and also across the lower end at 59, preferably about one foot above the end. This closes one end of the sleeve, and forms an end flap 60 or tail for use in holding the sleeve in the probe 17 during probing, and in the grain 12 during removal of the probe. With a probe having a one and one-half inch inside diameter, a sleeve of about the same size is recommended, with a flat width of about two inches. The length of the sleeve is slightly greater than the length of the probe, to extend out of the upper end of the probe a distance of from several inches to a few feet. It should be noted, however, that the portion 15$^a$ of the sleeve above the fumigant 11 serves only as a connector, so that a shortened sleeve, shorter than the probe, with a flexible connector of another form such as a line, is generally equivalent to the longer sleeve.

At the upper end of the sleeve, a flared, funnel-shaped extension 61 (FIG. 8) is provided on the sleeve to facilitate introduction of solid fumigant. This extension may be integral with the sleeve as shown, or may be an attachment. A suitable gas-permeable material is nylon fabric.

High-speed installation of sleeves 15 in the probe 17 is enhanced by the use of a flexible line 62 that is attached to the upper end portion of the probe, for example by tying to an eye 63 (FIGS. 9 and 11) just outside the upper end, and extends into and through the probe, when no sleeve is in it. This line can be secured to the open end of a sleeve with a quick-release knot 63, as shown in FIG. 10, and then pulled into the probe with the line. The line remains connected to the sleeve as it is placed, and is pulled back into the probe as the latter is withdrawn from the grain, leaving the sleeve 15 in place.

A knot 64 (FIGS. 10 and 13) in the sleeve closes its upper end to hold the fumigant in the sleeve and insure that the residue is retained in the sleeve after use. This knot can be applied either before or after the sleeve is drawn into the probe when the fumigant is placed in the sleeve before the latter is placed in the sleeve.

With this probe/sleeve construction, a sleeve 15 can be loaded quickly into the probe 17 after introduction of a charge of fumigant 11, and then placed quickly in the grain 13, using the manipulator mechanism to drive the probe deeply into the grain and then remove the probe for reloading. When numerous sleeves are being placed in each of several holds, the savings in time and effort are considerable, and the improvement in effectiveness of fumigation is significant.

From the foregoing, it will be evident that the present invention provides an improved method and apparatus for placing solid fumigant in grain and the like. It also will be evident that while the presently preferred embodiments have been illustrated and described with particularity, various modifications and changes may be made within the spirit and scope of the invention.

What is claimed is:

1. Fumigating apparatus for use in placing solid fumigant in a commodity in a storage compartment, comprising:
   an elongated probe;
   an elongated gas-permeable sleeve having an open end for receiving fumigant and a closed end, said sleeve being telescoped with said probe for placement in the commodity;
   a probe manipulator mechanism comprising drive means disposed around said probe in gripping engagement with the latter and operable when activated to drive the probe endwise, said drive means comprising at least one pair of drive rollers with the probe disposed between the, and means holding said rollers in driving engagement with said probe; and a power operator coupled to said drive means and operable to activate the drive means to drive said probe into the commodity with said sleeve in telescoped relation with the probe;
   said power operator being reversible to withdraw said probe from the commodity;
   and means for retaining said sleeve in the commodity as the probe in withdrawn.

2. Fumigating apparatus as defined in claim 1 wherein said probe is a stiff tube, and said sleeve is composed of gas-permeable fabric.

3. Fumigating apparatus as defined in claim 2 wherein said sleeve has a flap extending beyond said closed end and positioned outside said probe to form said means for retaining the sleeve in the commodity, said flap also retaining said sleeve in said probe as the latter is driven into the commodity.

4. Fumigating apparatus as defined in claim 2 wherein said sleeve has a funnel-shaped extension at said open end.

5. Fumigating apparatus as defined in claim 2 wherein said sleeve is longer than said probe to extend out of both ends thereof.

6. Fumigating apparatus as defined in claim 2 further including a flexible line attached to said sleeve adjacent the open end and to said probe, said line being positioned to be drawn into the probe as the probe is withdrawn from around the sleeve, thereby positioning the line for attachment to another sleeve to draw the latter into the probe.

7. Fumigating apparatus as defined in claim 1 wherein said probe manipulator mechanism also includes a base forming a platform for the mechanism, and a housing for said drive means, said base, housing and power operator being releasably secured together for quick assembly and disassembly of the mechanism.

8. Fumigating apparatus as defined in claim 1 wherein said drive rollers are mounted in a housing for movement between open and closed positions, for placement around said probe.

9. Fumigating apparatus as defined in claim 8 wherein said housing comprises two side sections that are hinged together for swinging between open and closed positions, one of said rollers being mounted in each of said side sections to be swung into driving engagement with said probe as an incident to swinging of the side sections to the closed position.

10. Fumigating apparatus as defined in claim 9 further including means for drawing said side sections together to clamp said probe between said rollers.

11. Fumigating apparatus as defined in claim 10 wherein three pairs of rollers are mounted in said housing, in longitudinally spaced relation along said probe, one roller of each pair being drivingly coupled to said power operator.

12. Fumigating apparatus as defined in claim 1 wherein said drive means are disposed within a housing, and are movable in the housing between open and closed positions to be clamped around said probe.

13. Fumigating apparatus as defined in claim 12 further including a base providing a platform beneath said housing, said base having a notch in one side permitting the base to be moved around said probe while the latter is standing over the commodity.

14. Fumigating apparatus as defined in claim 13 wherein said base comprises two plates in edge-to-edge relation and hinged together for folding.

15. Fumigating apparatus as defined in claim 13 wherein said housing and said base have quick coupling elements for attaching said housing to said base and around the probe.

16. Fumigating apparatus as defined in claim 1 wherein said power operator comprises a motor and a reduction gear box on a common support, and a quick release coupling for said drive means for rapid assembly and disassembly of said manipulator mechanism.

* * * * *